(12) United States Patent
Zolotarsky

(10) Patent No.: US 11,104,411 B2
(45) Date of Patent: Aug. 31, 2021

(54) BALLAST WATER TREATMENT AND NEUTRALIZATION

(71) Applicant: EVOQUA WATER TECHNOLOGIES LLC, Pittsburgh, PA (US)

(72) Inventor: Vadim Zolotarsky, Springfield, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 258 days.

(21) Appl. No.: 16/335,431

(22) PCT Filed: Sep. 25, 2017

(86) PCT No.: PCT/US2017/053165
§ 371 (c)(1),
(2) Date: Mar. 21, 2019

(87) PCT Pub. No.: WO2018/058011
PCT Pub. Date: Mar. 29, 2018

(65) Prior Publication Data
US 2020/0017185 A1     Jan. 16, 2020

Related U.S. Application Data

(60) Provisional application No. 62/398,798, filed on Sep. 23, 2016.

(51) Int. Cl.
*B63J 4/00* (2006.01)
*C02F 1/00* (2006.01)
(Continued)

(52) U.S. Cl.
CPC ............... *B63J 4/002* (2013.01); *C02F 1/004* (2013.01); *C02F 1/008* (2013.01); *C02F 1/4674* (2013.01); *C02F 1/68* (2013.01); *B63B 13/00* (2013.01); *C02F 2103/008* (2013.01); *C02F 2209/04* (2013.01); *C02F 2303/185* (2013.01)

(58) Field of Classification Search
CPC . B63J 4/002; C02F 1/004; C02F 1/008; C02F 1/4674; C02F 1/68; C02F 2103/008; C02F 2209/04; C02F 2303/185; B63B 13/00
USPC ...... 210/198.1, 206, 748.01, 748.16, 748.17, 210/748.2, 753, 754, 756, 764, 739
See application file for complete search history.

(56) References Cited

U.S. PATENT DOCUMENTS

| 8,147,673 B2 | 4/2012 | Childers, II et al. |
| 8,241,506 B1 * | 8/2012 | Vernier ................. E04H 4/1254 210/776 |

(Continued)

FOREIGN PATENT DOCUMENTS

WO     2003033408 A2     4/2003

OTHER PUBLICATIONS

International Search Report for corresponding PCT/US2017/053165, dated Jan. 26, 2018.

*Primary Examiner* — Fred Prince

(57) ABSTRACT

Techniques and systems for neutralizing discharge waters from ballast and/or cooling water biocidal treatment and disinfection systems are provided. The systems utilize oxidation reduction potential control to regulate the dechlorination of a biocidal agent to allowable discharge levels in ship buoyancy systems and ship cooling water systems.

22 Claims, 7 Drawing Sheets

(51) Int. Cl.
*C02F 1/467* (2006.01)
*C02F 1/68* (2006.01)
*B63B 13/00* (2006.01)
*C02F 103/00* (2006.01)

(56) References Cited

U.S. PATENT DOCUMENTS

| | | | |
|---|---|---|---|
| 8,999,173 B2* | 4/2015 | Schwartzel | C02F 1/46176 |
| | | | 210/748.01 |
| 2003/0121464 A1* | 7/2003 | O'Reilly | A01N 35/02 |
| | | | 114/125 |
| 2005/0224409 A1 | 10/2005 | Harshman et al. | |
| 2011/0120956 A1 | 5/2011 | Ivanter et al. | |
| 2013/0020265 A1 | 1/2013 | Kamatsuchi et al. | |
| 2013/0081988 A1* | 4/2013 | Blum | F17D 1/08 |
| | | | 210/192 |
| 2015/0081227 A1* | 3/2015 | Fukuzawa | B63J 4/002 |
| | | | 702/25 |
| 2015/0336822 A1* | 11/2015 | Adams | C02F 1/50 |
| | | | 210/749 |

* cited by examiner

BALLAST WATER TREATMENT AND NEUTRALIZATION

CROSS-REFERENCE TO RELATED APPLICATION

This disclosure claims the benefit of U.S. Patent Application No. 62/398,798, titled BALLAST WATER DECHLORINATION SYSTEM AND METHOD, filed on Sep. 23, 2016, which is incorporated herein by reference in its entirety for all purposes.

FIELD

This disclosure relates to ship buoyancy disinfection and biofouling treatment systems and techniques and, in particular, to utilizing oxidation reduction potential values and retention duration to inhibit biological activity and to regulate the neutralization of electrocatalytically generated chlorine-based oxidizing agents or biocides.

RELATED ART

Chlorine-based disinfection systems can utilize chlorine gas, bulk sodium hypochlorite, and in-situ generated chlorine or sodium hypochlorite electrolytic generators. The electrolysis of seawater to produce chlorine has been used for biofouling control of cooling systems, such as systems that utilize seawater as a coolant. Further, the development of self-cleaning tube-in-tube electrochemical cells has resulted in use of electrochlorination in shipboard applications, such as for biofouling control of engine cooling system, and air conditioning and other auxiliary systems.

A typical system layout for a land-based electrochlorination system is schematically presented in FIG. 1. Chloride-containing water, such as seawater, is retrieved from a source 1 and pumped by a pump 2 through an electrolytic generator 3 whereat a chlorine-based biocidal agent or biocide can be generated. The outlet of the electrolytic generator 3 containing the biocidal agent is optionally delivered into a storage tank 5. A power supply 4 provides electrical current to the electrolytic generator 3 to effect generation of the chlorine-based biocidal agent. Storage tank 5 is typically equipped with one or more air blowers 6 that provide dilution or dispersion of a hydrogen gas by-product to a safe concentration. Hydrogen gas removal can be effected with hydrocyclones instead of or in addition to the air blowers and tanks. One or more dosing pumps 7 can be utilized to dose the biocidal agent to a point of use typically by way of a distribution device 8. The point of use is typically an intake basin which provides water to another process such as, but not limited to, a cooling loop 9. In some applications, dechlorination systems (not shown) may utilize a neutralizing agent for downstream treatment of the cooling water, prior to discharge thereof. Land-based systems can produce hypochlorite solutions at relatively high concentrations, e.g., in a range of about 500 ppm to 2,000 ppm chlorine.

Ships use ballast water tanks to provide stability and maneuverability. Typically, ballast tanks are filled with water at one port after or during cargo unloading operations. The ballast water then may be discharged at another port during cargo loading operations. Effectively, ballast water could be transferred from the first port to the second port, with a potential for the introduction of aquatic nuisance species (ANS) at the second port, which can be a detrimental ecological issue.

Shipboard ballast water management (BWM) systems may utilize electrochlorination systems, such the system exemplarily schematically illustrated in FIG. 2, to reduce or inhibit biological activity of ANS in the ballast water. Typically, BWM systems are configured for low chlorine output with direct injection of chlorinated water, e.g., containing a chlorine-based biocide. In shipboard systems, seawater is typically delivered from a source, such as a sea chest 1 using a booster pump 2 to an electrolytic generator 3 which is typically powered by a power supply 4 to generate the chlorine-based biocide. A product stream containing the biocide from electrolytic generator 3 is typically injected into sea chest 1 through a distribution device 8. Water can be discharged outboard D. Typically, a chlorine concentration analyzer (not shown) is utilized to monitor and maintain a concentration of residual chlorine. Such systems, however, do not consider variabilities in chlorine demand in different ports where ballasting operations may occur. For example, chlorine demand may be affected by the concentration of nitrogen compounds in seawater, which may vary significantly from port to port and from season to season. The fluctuations in chlorine demand can create a higher than desirable or acceptable oxidizer concentration, e.g., high free chlorine concentration, in the various shipboard systems which, in turn can accelerate or promote corrosion of the ship systems and ancillary unit operations, such as but not limited to ballast water pumps, piping, and tanks. Further the variabilities associated with chlorine analyser control schemes can promote undesirable formation of disinfection by-products (DBP).

SUMMARY

One or more aspects of the disclosure can be directed to BWM systems in a ship. In some cases, the BWM system can be directed to treating ballast water in the BWM system. In some cases, the BWM system can involve utilizing a biocide. In some cases, the BWM system can comprise a biocide generator. For example, the BWM system can comprise a chlorination system comprising the biocide generator, e.g., an electrolyzer configured to generate a chlorine-based biocide to be introduced into ballast water in the ballast tank. In further cases, the BWM can further comprise a dechlorination system configured to at least partially neutralize, e.g., reduce the biocide in the ballast water. The BWM system can further comprise a first controller configured to regulate operation of any one or more of the electrolyzer and the dechlorination system. The dechlorination system can comprise a source of neutralizing agent selected to reduce the biocide, e.g., the chlorine-based biocide, in ballast water to be discharged from the ship. The dechlorination system can further include an oxidation-reduction potential (ORP) sensor configured to determine an ORP value of the ballast water to be discharged. The dechlorination system can involve a second controller configured to regulate addition of the neutralizing agent to the ballast water to be discharged in at least one of a first dechlorination mode, a second dechlorination mode, and a third dechlorination mode. The second controller regulates addition of the neutralizing agent in the first dechlorination mode if the ORP value of the ballast water to be discharged is a maximum desired value of less than about 200 mV. The second controller regulates addition of the neutralizing agent in the second dechlorination mode if the ORP value of the ballast water to be discharged is less than about 200 mV. The second controller regulates addition of the neutralizing agent in the third dechlorination mode if the ORP value of ballast water to be discharged is a minimum desired value of at least about 200 mV.

In some embodiments the dechlorination system further comprises a second ORP sensor configured to determine an ORP value of the ballast water downstream from a point of introduction of the neutralizing agent into the ballast water to be discharged.

In some embodiments the second controller is further configured to regulate addition of the neutralizing agent to a high target dechlorination concentration of neutralizing agent in the ballast water to be discharged.

In some embodiments the first high target dechlorination concentration is about 12 mg/L, the second high target concentration is about 8 mg/L, the third high target dechlorination concentration is about 8 mg/L, the fourth high target dechlorination concentration is about 5 mg/L, and the fifth high target concentration is about 3 mg/L.

In some embodiments the first high target dechlorination concentration is about 6 mg/L, the second high target concentration is about 3 mg/L, the third high target dechlorination concentration is about 6 mg/L, the fourth high target dechlorination concentration is about 5 mg/L, and the fifth high target concentration is about 3 mg/L.

In some embodiments the first low target dechlorination concentration is about 5 mg/L, the second low target concentration is about 3 mg/L, the third low target dechlorination concentration is about 5 mg/L, the fourth low target dechlorination concentration is about 3 mg/L, and the fifth low target concentration is about 1 mg/L.

In some embodiments the first low target dechlorination concentration is about 3 mg/L, the second low target concentration is about 1 mg/L, the third low target dechlorination concentration is about 3 mg/L, the fourth low target dechlorination concentration is about 2 mg/L, and the fifth low target concentration is about 1 mg/L.

In some embodiments the first target dechlorination concentration is in a range of from about 5 mg/L to about 12 mg/L, the second target concentration is in a range of from about 3 mg/L to about 8 mg/L, the third target dechlorination concentration is in a range of from about 5 mg/L to about 8 mg/L, the fourth target dechlorination concentration is in a range of from about 3 mg/L to about 5 mg/L, and the fifth target concentration is in a range of from about 1 mg/L to about 3 mg/L.

In some embodiments the first target dechlorination concentration is in a range of from about 3 mg/L to about 6 mg/L, the second target concentration is in a range of from about 1 mg/L to about 3 mg/L, the third target dechlorination concentration is in a range of from about 3 mg/L to about 6 mg/L, the fourth target dechlorination concentration is in a range of from about 2 mg/L to about 5 mg/L, and the fifth target concentration is in a range of from about 1 mg/L to about 3 mg/L.

According to another aspect, embodiments of the present disclosure provide a method of managing ship ballast water. The method comprising drawing ballast water into a ballast tank of the ship; electrolytically generating a chlorine-based biocide; introducing the chlorine based-biocide into the ballast water; discharging the ballast water from the ballast tank; dechlorinating the ballast water by adding a neutralizing agent to the ballast water during discharge thereof from the ballast tank in at least one of a low dechlorination mode and a high dechlorination mode. The dechlorination is performed in the low dechlorination mode if the ORP value of the ballast water to be discharged is less than about 200 mV. The dechlorination is performed in the high dechlorination mode if the ORP value of ballast water to be discharged is at least about 200 mV.

In some embodiments the method further comprises confirming dechlorination of the ballast water by determining a second ORP value of the ballast water discharge after the addition of the neutralizing agent. The dechlorination of the ballast water to be discharged is confirmed if at least one of (a) the second ORP value is less than the ORP value of the ballast water before adding the neutralizing agent when dechlorinating is performed in the low dechlorination mode, and (b) the second ORP value is less than about 300 mV when dechlorination is performed in the high dechlorination mode.

According to another aspect, embodiments of the present disclosure provide a BWM system fluidly connected to a ship ballast water system configured to introduce ballast water from a source of ballast water into a ballast tank and discharge ballast water from the ballast tank. The BWM system comprising an oxidation-reduction potential (ORP) sensor disposed to measure at least one of a first ORP value of the ballast water from the source of ballast water and a second ORP value of the ballast water discharged from the ballast tank; a chlorination system configured to electrolytically generate a hypochlorite biocide and disposed to introduce at least a portion of the generated hypochlorite biocide into the ballast water; a dechlorination system configured to introduce a neutralizing agent to the ballast water discharged from the ballast tank in at least one of a low dechlorination mode and a high dechlorination mode.

In some embodiments the BWM system further comprises a ballast water pump disposed to withdraw ballast water from the source of ballast water and introduce the ballast water into the ballast tank; a filter disposed to remove at least a portion of the solids in the ballast water from the source of ballast water; and a second ORP sensor disposed to measure a third ORP value of the ballast water discharged from the ballast tank.

In some embodiments the BWM system further comprises a source of chloride containing water fluidly connected upstream of the chlorination system, and wherein the chlorination system is further configured to electrolytically generate the hypochlorite biocide from the chloride-containing water.

In some embodiments the BWM system further comprises a chlorination system configured to introduce at least a portion of the generated hypochlorite biocide into the ballast water upstream of the filter.

In some embodiments the BWM system further comprises a source of chloride containing water is one of a ship cooling water system, a sea chest, and a water storage tank.

In some embodiments the BWM system further comprises a controller configured to confirm dechlorination of the ballast water discharged from the ballast tank based on the third ORP value.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. In the drawings.

DESCRIPTION

Figure 1:
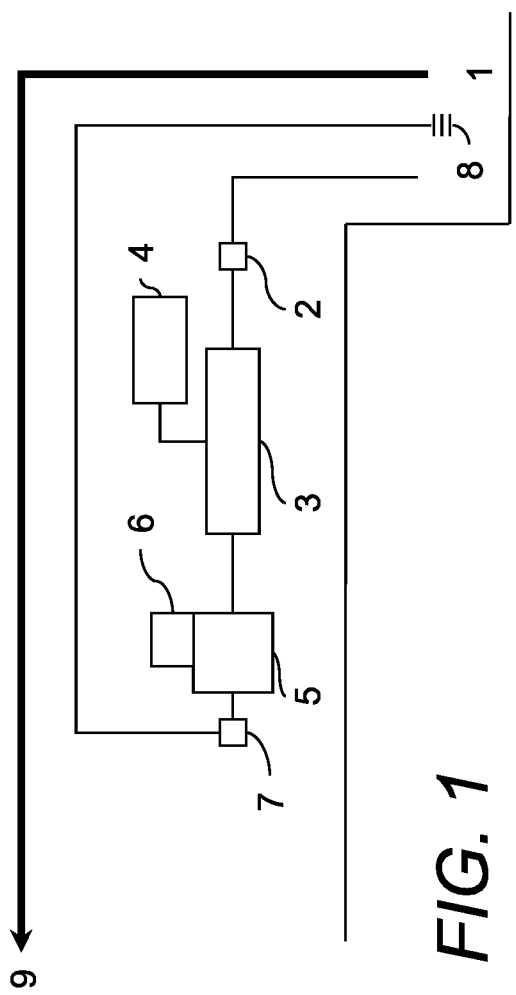
FIG. 1 is a schematic illustration of a land-based electrochlorination system.
Figure 2:
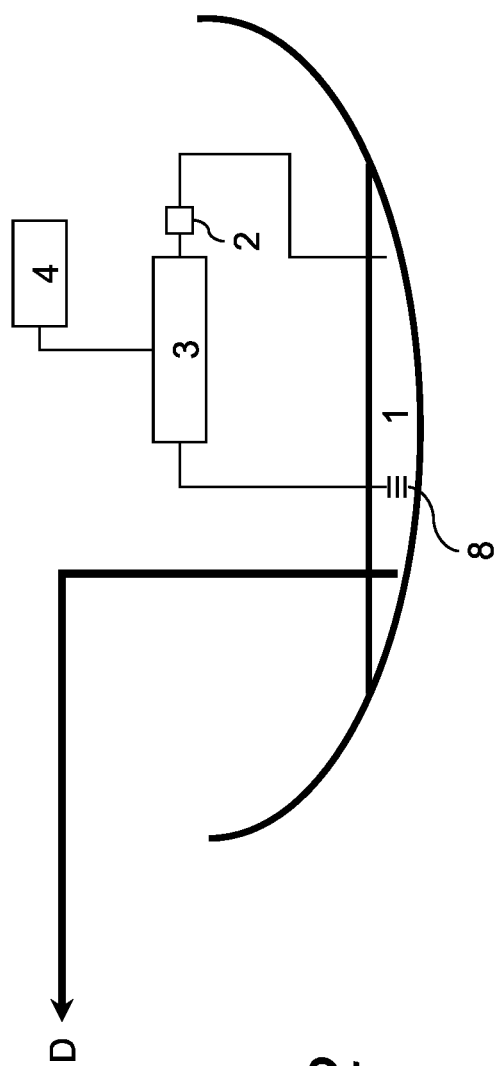
FIG. 2 is a schematic illustration of a shipboard electrochlorination system.

One or more aspects of the present disclosure pertain to ballast water management systems. Some aspects of the present disclosure provide ballast water management systems and techniques that can reduce the likelihood of ANS dispersion. One or more aspects of the present disclosure pertain to electrochlorination systems in ballast water management systems. Still other aspects of the disclosure provide ballast water management systems that utilize electrolytic treatment of ballast water. Other aspects of the disclosure provide ballast water management systems and techniques that maintain an oxidation reduction potential value in ballast water sufficient to remediate ANS. Other aspects of the disclosure provide ballast water management systems and techniques that control biocide concentrations without further remediation subsystems and techniques before the ballast water can be discharged. Some advantageous aspects of the disclosure provide systems and techniques that reduce the likelihood of excess or undesirable levels of oxidizing biocidal agents. One or more further aspects of the present disclosure involve ballast water management system that provide discharge ballast water having acceptable levels of biocide. Further aspects of the disclosure provide retrofitting or modification of existing ship ballast water management systems. One or more aspects of the present disclosure relates, in some cases, to disinfection systems and techniques for treating ballast water in ship buoyancy systems and biofouling control or treatment in other ship systems. One or more aspects of the disclosure can be particularly directed to a shipboard treating system for cooling water systems and ballast water systems. Even further aspects of the disclosure relate to facilitating any of the above noted aspects.

In some cases, the ballast water management system comprises one or more ballast tanks fluidly connected, alone or in combination to one or more sources of ballast water through a ballast line or ballast lines. In some cases, the ballast water management system further comprises a biocidal agent or biocide, or a source of biocide. As used herein, the biocide is any agent that neutralizes, inactivates, disinfects, or biologically renders organisms, typically microorganisms in the ballast water, to be inert or at least incapable of further biological activity. In some configurations, the biocide can be a chlorine-based oxidizing agent. In still some embodiments of the ballast water management system, the biocide can be generated in-situ. For example, the source of biocide can comprise an electrolyzer configured to electrolytically generate a chlorine-based biocide from a chloride-containing water.

The operation of the ballast water management system can be based on at least one measured characteristic of the ballast water. Some aspects of the disclosure can provide minimal level of a biocide that still provides or even ensures disinfection of ballast water, preferably with little or minimal corrosion of the water-containing structures of the ballast water system, as well as little or minimal formation of potentially hazardous disinfection by-products. Some aspects of the present disclosure can provide systems based, at least partially, on an oxidation reduction potential of water to be treated or being treated, e.g., ballast water to be introduced into the ballast tank. Some particular aspects of the disclosure provide systems and techniques that advantageously provide minimal levels of biocide, e.g., free available chlorine, or involve biocide concentrations that ensure effective inactivation of biological activity or disinfection of ballast water while minimizing or at least reducing the likelihood of corrosion of the ship structures and ancillary unit operations, and, in some cases, minimal or at least reduced formation of potentially hazardous disinfection by-products.

In some cases, the ballast water management system can be configured to introduce ballast water into a ballast tank through a ballast water line and to discharge ballast water from the ballast tank. The system typically comprises a biocide source configured to introduce a biocide into the ballast water and a neutralization system configured to introduce, during an introduction period, a neutralizing agent into the discharge ballast water at a neutralization agent introduction site in at least one of a LOW mode, at a first dosage rate of neutralizing agent, and a HIGH mode, at a second dosage rate of neutralizing agent. Typically, the first dosage rate is less than the second dosage rate and the neutralization agent is selected to at least partially neutralize the biocidal activity of the biocide. In some configurations, the neutralization system introduces the neutralizing agent into the discharge ballast water in the HIGH mode during the introduction period. The system further comprises a ballast water pump disposed to pump the ballast water into the ballast tank through the ballast water line. The system further comprises a filter fluidly connected to the ballast water line and disposed to remove at least a portion of solids from the ballast water to be introduced into the ballast tank. The biocide source is configured to introduce at least a portion of the biocide upstream of the filter. The biocide source comprises an electrolyzer configured to electrolytically generate the biocide from a source of chloride-containing water; the source of chloride-containing water is any of a ship cooling water system, a sea chest, and a chloride-containing water storage tank. The biocide source comprises an inlet fluidly connected to a source of chloride-containing water that is fluidly isolated from the ballast water line. The system further comprises a first ORP sensor configured to measure a first ORP value of the discharge ballast water upstream of the neutralization agent introduction site. The neutralization system discontinues introducing the neutralizing agent, in an OFF mode, if, after the introduction period, the first ORP value is less than a target ORP value. The system further comprises a second ORP sensor configured to measure a second ORP value of the discharge ballast water downstream from the neutralization agent introduction site; and a controller configured to confirm neutralization of the biocide in the discharge ballast water if a difference between the first ORP value and the second ORP value is within a tolerance ORP value. The neutralization system discontinues introducing the neutralizing agent in the HIGH mode and introduces the neutralizing agent in the LOW mode if, after the introduction period, the first ORP value is less than a target ORP value. The system further comprises a second ORP sensor configured to measure a second ORP value of the discharge ballast water downstream from the neutralization agent introduction site and a controller can be configured to confirm neutralization of the biocide in the discharge ballast water if the second ORP value is less than the first ORP value. The neutralization system continues introducing the neutralizing agent in the HIGH mode if, after the introduction period, the first ORP value is greater than a target ORP value. The controller can be configured to confirm neutralization of the biocide in the discharge ballast water if the second ORP value is less than a conformity ORP value.

Some aspects of the disclosure can also be directed to managing discharge of discharge ballast water from a ballast tank through a ballast line. Managing can involve determining a first ORP value of the discharge ballast water and introducing a neutralizing agent into the discharge ballast water at a dosage rate during an introduction period. The neutralizing agent is typically selected to at least partially neutralize biocidal activity of a biocide in the discharge ballast water. Managing can involve determining a second ORP value of the discharge ballast water after introducing the neutralizing agent into the discharge ballast water and, after the introduction period, discontinuing introduction of the neutralizing agent if the first ORP value is less than a target ORP value, or reducing the dosage rate to a second dosage rate if first ORP value is less than the target ORP value, or continue introducing of the neutralizing agent at the dosage rate if the first ORP value is greater than the target ORP value. The biocide can be electrolytically from a chloride-containing water from a water source, wherein the water source is fluidly isolated from the ballast line. At least a portion particulates or organisms having at least one dimension of at least about forty microns can be removed before introducing the ballast water into the ballast tank. Before removing from the ballast water the at least a first portion of particulates or organisms, a first portion of the biocide can be introduced into the ballast water, and a second portion of the biocide can be introduced into the ballast water before the ballast water, having the particulates removed, is introduced into the ballast tank. Managing can further comprise confirming neutralization of the biocide based on a difference between the first ORP value and the second ORP value. The target ORP value is typically about 200 mV.

Another aspect of the present disclosure can be directed to a non-transitory computer-readable medium having computer executable instructions which, when executed by a controller, cause the controller to receive a measured ORP value representative of an ORP of a discharge ballast water being discharged from a ballast tank through a ballast line of a ship; introduce a neutralizing agent from a source of neutralizing agent into the discharge ballast water at a first dosage rate for an introduction period, in which the neutralizing agent is selected to at least partially neutralize biocidal activity of a biocide in the discharge ballast water; and discontinue introduction of the neutralizing agent, after the introduction period, if the measured ORP value is less than a target ORP value, or reduce the first dosage rate, after the introduction period, to a second dosage rate if the measured ORP value is less than the target ORP value, or maintain introduction of the neutralizing agent, after the introduction period, at the first dosage rate if the measured ORP value is greater than the target ORP value.

In some configurations, the system can comprise a source of ballast water, e.g., seawater; a sensor disposed to measure and transmit a measured signal representative of an oxidation reduction potential of the ballast water; a biocide source disposed to introduce a biocide into the ballast water; and a controller disposed to receive the measured signal from the sensor, and configured to generate and transmit an output signal, based at least partially on the measured signal and a treating ORP value, which is typically in a range of from about 200 mV to about 1,000 mV, to the biocide source to regulate a rate of introduction of the biocide into the ballast water. In some cases, the biocide source can comprise an electrochlorination system, configured to generate a halogen-based biocide from chloride containing water. In other cases, the electrochlorination system can comprise an inlet fluidly connected to the source of ballast water, seawater, water containing a chloride species or combinations thereof, and can be configured to generate a hypochlorite compound as a biocide. The electrochlorination system can comprise a first outlet that is fluidly connected to an outlet of the source of ballast water, seawater, water containing a chloride species or combinations thereof at point downstream thereof. In some cases, the electrochlorination system can comprise a second outlet that is fluidly connected upstream of the ballast tank inlet and downstream of the electrochlorination system inlet. The electrochlorination system is typically configured to generate a hypochlorite compound and an oxygenated species. In some cases, the output signal typically regulates an electrical current density through an electrolyzer of the electrochlorination system of at least about 1,000 Amp/$m^2$. In still further embodiments of the shipboard water treatment system, the treating ORP value is in a range of from about 500 mV to about 750 mV. Further, the treating ORP value can be based on a mandated or regulated disinfection requirement. The controller can also be configured to regulate a rate of introduction of the biocide into the sea chest to achieve a target biofouling control value in water introduced into the shipboard cooling system. The system can further comprise a degassing tank fluidly connected downstream of the electrolyzer. The source of ballast water, seawater, water containing a chloride species or combinations thereof can be a sea chest which can be fluidly connected to a shipboard cooling water system.

One or more aspects of the disclosure pertaining to managing ballast water can be directed to treating ballast water to be introduced into the ballast tank from a source of ballast water through a ballast line. In some embodiments thereof, the method of treating water to be introduced into the ballast tank can comprise introducing a biocide into the water; and regulating a rate of introduction of the biocide to achieve a target water oxidation reduction potential value in a range of from about 200 mV to about 1,000 mV in the water. Introducing the biocide can comprise generating a biocide stream comprising at least one halogenated species. Regulating the rate of introduction of the biocide can comprise regulating an operating parameter of a biocide generator to achieve a target water oxidation reduction potential value in a range of from about 500 mV to about 750 mV. The method of treating water to be introduced into the ballast tank can further comprise introducing a portion of the biocide stream into a source of the water. The method of treating water to be introduced into the ballast tank can further comprise regulating a rate of addition of the biocide into the source of the water to achieve a desired biofouling-control concentration of the biocide. In some advantageous embodiments, the method of treating water can comprise electrolyzing chloride containing water in an electrolyzer to generate a biocide stream. Electrolyzing a portion of the water from the source can comprise generating the biocide stream comprising a hypochlorite and, in some cases, a biocide stream comprising a hypochlorite and an oxygenated species. The source of the chloride containing water may comprise a sea chest fluidly connected to a shipboard cooling system. In some cases, the source of chloride containing water is fluidly isolated from the ballast line introducing ballast water into a ballast tank. In other configurations, however, the source of chloride containing water can be a cooling system having seawater circulating therethrough, another ballast tank, a separate storage tank, or combinations thereof. In still other configurations, the source of chloride containing water can be storage tank capable of being at least partially filled with seawater from, for example, a seachest.

One or more aspects of the disclosure can be directed to a method of modifying a ballast water system having a ballast tank connected to a source of seawater through a ballast line. In some embodiments thereof, the method of modifying the ballast water system can comprise connecting an inlet of an electrolyzer to the source of seawater, connecting an outlet of the electrolyzer outlet to an inlet of a degassing tank, and connecting a controller to the electrolyzer and to an oxidation reduction potential sensor disposed downstream of an outlet of the degassing tank. The controller is preferably configured to regulate an operating parameter of the electrolyzer to achieve a target oxidation reduction potential value in a range of from about 200 mV to about 1,000 mV in the seawater to be introduced into the ballast tank. The target oxidation reduction potential value may be in a range of from about 500 mV to about 750 mV. The method of modifying the ballast water system can further comprise connecting the degassing tank outlet to an inlet of the ballast tank. Further, the method of modifying the ballast water system can comprise connecting the degassing tank outlet to the source of seawater. The method can comprise disposing the oxidation reduction potential sensor upstream of a filter connected between the source of the seawater and the ballast tank. The source or seawater can comprise a seachest or reservoir which advantageously store chloride containing water. The shipboard water treatment system can have a target oxidation reduction potential value is in a range of 650 ppm to 750 ppm. The sensor can comprise a gold-tip electrode. The shipboard water treatment system may further comprise a second sensor disposed to measure at least one of a free chlorine concentration and an oxidation reduction potential of water in the ballast tank. The shipboard water treatment system can have a second sensor disposed to measure and transmit a second measured signal representative of at least one of a free chlorine concentration, total chlorine concentration, and an oxidation reduction potential value of water to be discharged from the ballast tank. The shipboard water treatment system can comprise a controller further configured to receive the second measured signal, and to generate a second output signal based at least partially on the second measured signal and at least one of a target free chlorine concentration, a target total chlorine concentration, and a second target oxidation reduction potential value.

One or more aspects of the disclosure can be directed to a shipboard water treatment system on a ship in a body of water. The treatment system can comprise a source of water containing at least one chloride species, a filter fluidly connected to at least one of the source and the body of water, a ballast tank fluidly connected downstream from the filter, a sensor disposed to measure and transmit a measured signal representative of an oxidation reduction potential of the seawater, a biocide source disposed to introduce a biocide into the ballast tank, and a controller disposed to receive the measured signal from the sensor, and configured to generate and transmit an output signal, based at least partially on the measured signal and a target oxidation reduction potential value in a range of from about 200 mV to about 1,000 mV, to the biocide source to regulate a rate of introduction of the biocide into at least one of the ballast tank and into water to be introduced into the filter.

Further embodiments directed to shipboard water treatment systems can comprise a source of seawater, water containing chloride species, or mixtures thereof, which can be a storage vessel utilized to store the seawater, water containing chloride species or mixtures thereof, when the ship is not in seawater. Thus, for example, seawater can be accumulated and stored in one or more reservoirs and utilized by one or more biocide sources described herein, when the ship is transiting through fresh water bodies. Indeed, in some embodiments, a ship having two or more ballast tanks can utilize any of the ballast tanks to store seawater and subsequently utilize at least a portion of the stored seawater as the source of chloride containing water for the biocide source.

One or more aspects of the disclosure provide biofouling control of ship water systems. For example, electrocatalytically generated agents utilized in disinfection can also be used to inhibit biofouling of a ship's cooling system, typically at oxidizer concentrations that are less than those utilized in disinfection.

Chlorine demand can be related to the presence of inorganic and organic compounds that react with chlorine. Until the chlorine demand is met, there will likely be no free chlorine available for disinfection. If nitrogen compounds are present, chloramines can be formed, which are considered to be weaker biocides than free chlorine. Chlorine dose (CD) is typically dependent on a total residual chlorine (TRC) and chlorine demand ($Demand_{chlorine}$), as represented by the relationship in equation (1).

$$TRC = Dose_{chlorine} - Demand_{chlorine} \quad (1)$$

The total residual chlorine can be represented by the relationship in equation (2).

$$TRC = [\text{chloramine}] + [\text{free chlorine}] \quad (2)$$

When present, free chlorine, such as HOCl, typically dissociates in accordance with the relationship in equation (3).

$$HOCl \rightarrow H^+ + OCl^- \quad (3)$$

Hypochlorous acid (HOCl) is a preferred biocide. The use of TRC for characterizing effectiveness of the chlorine treatment, however, cannot provide an accurate prediction of the disinfection effectiveness, especially for treating ballast water pumped onboard a ship from polluted port harbors because variabilities in chloramine concentrations can create a range of effective TRC, from as low as below five ppm to as high as 40 ppm. If an excess of free chlorine is used to accommodate the demand variabilities, undesirable corrosion risks, such as corrosion of the ship steel structures, result as well as the formation of potentially toxic disinfection by-products, such as trihalomethanes (THM), which typically depends on chlorine demand and levels of free available chlorine.

The present disclosure thus provides systems and techniques that provide reliable control of biocide addition or introduction at a level that result in effective disinfection of, for example, ballast water. Indeed, some aspects of the disclosure provide systems and techniques that reduce the likelihood of over-chlorination. Still further aspects of the disclosure can involve systems and techniques that allow selection, monitoring of, and regulating to an effective biocide dose that would minimize or reduce the likelihood corrosion and by-product generation. Preferred aspects of the disclosure provide effective disinfection of ballast water in any port independent of the local seawater conditions such as chlorine demand, pollution level, and pH, which can be ensured by utilizing aspects of the disclosure that maintain a sufficient biocide oxidizing strength, as represented by a measured ORP or redox potential.

At least one ORP probe or sensor configured to measure an oxidation reduction or redox potential of the water can be utilized in one or more embodiments of the disclosure. The measured potential may be defined by the most active oxidizing or reducing agent in water, which in some aspects of the disclosure, would typically be HOCl. Because, however, seawater typically comprises about 50 ppm to about 60 ppm sodium bromide, seawater disinfection utilizing chlorine may at least partially be effected through a brominated species, e.g., hypobromous acid, converted according to equation (4).

$$HOCl + NaBr \rightarrow NaCl + HOBr \qquad (4)$$

The redox potential $E_h$ for a specific application is typically based on the Nernst equation (5).

$$E_h = E^0 + \frac{RT}{nF}\log\left(\frac{A_{ox}}{A_{red}}\right) \qquad (5)$$

where $E_h$ is the redox potential of the reaction, $E^0$ is the standard potential, RT/nF is the Nernst number, $A_{ox}$ represents the activity of the oxidant, and $A_{red}$ represents the activity of the reductant.

Chlorine typically has a standard potential of 1490 mV and bromine typically has a standard potential of 1330 mV. At a typical pH of seawater within a range of 7 to 8.4, the concentration of HOBr is more stable than the concentration of HOCl. For example, at a pH of 8.0 the non-dissociated HOBr species is at about 83% whereas the HOCl species is at about 28%. Thus, it is believed that the ORP level required for disinfection of seawater by chlorine may be different than the one established for freshwater.

Establishing a treating ORP value for treating seawater, such as for ballast water treatment may be advantageous to facilitate maintaining an oxidizer, e.g., chlorine, concentration at a level that provides disinfection or biofouling control while providing a low potential for corrosion of piping and other wetted hull structures. It is believed that for certain systems, including continuous chlorination type systems, the chlorine level (or the oxidizer level) can be maintained in a range at below about 0.5 ppm to 1.0 ppm, and preferably within a range of from 0.1 ppm to 0.2 ppm. Thus, in some embodiments, the upper limit of the treating ORP value may be determined so as to provide a corresponding chlorine level of about 1 ppm, or to provide conditions that do not exceed acceptable corrosion rates. Empirical information may be utilized to at least partially establish a relationship between ORP level and measured corrosion rates. For example, a steel corrosion rate of 1 mil per year may be used as an acceptable guideline to at least partially define the upper limit of the treating ORP value. The lower limit of the treating ORP value may be determined to be at conditions that sufficiently provide desired inactivation effect. For example, empirical information can be used to establish a relationship between ORP level and inactivation efficiency.

Factors that can affect the germicidal efficacy of free chlorine residual techniques include the chlorine residual concentration, contact time, pH, and water temperature. pH may also vary from port to port or from season to season. For example, a high seawater pH can result from the seasonal algae bloom. Because fixed chlorine output-based treatments system are typically designed to meet the worst case scenario, i.e., at high pH, over-chlorination of ballast water can result under conditions of a lower seawater pH, with associated increased corrosion potential and increased likelihood of DBP formation.

Unlike residual chlorine analyzers that measure chlorine concentration and not its disinfection strength, ORP sensors provide a qualitative representation of the oxidizing (electron consuming) potential or reducing (electron supplying) potential of water being treated.

Further observation from the experimental data shows that when the amount of reductants is constant, the redox potential and the residual chlorine concentration may both be used as parameters for the rate of inactivation, but when the amount of reductants is changed then only redox potential may still be used.

The water treatment process of the disclosure is typically performed with a batch of seawater which can be used as ballast water. In such cases, the oxidizer concentration, such as chlorine, typically decreases over time because the oxidizer reacts with inorganic, organic, and biologic matter. The present disclosure, in some aspects, provides control of the treated water ORP potential based on a dynamic of concentration in the water being treated. Thus, the ORP control is typically devised to provide time for a biocide to be effective in inactivating at least a portion, or preferably, substantially all, ANS, e.g., with a time delay loop, while minimizing potential harm of corrosion to the ship structure and formation of DBP.

Figure 3:
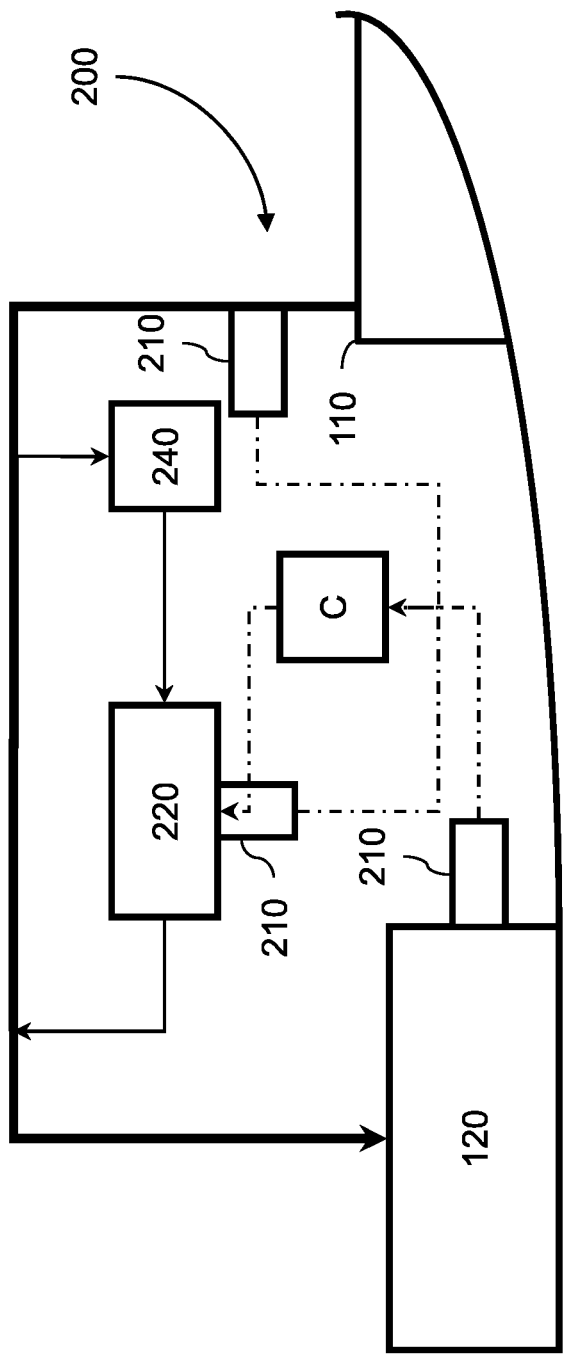
FIG. 3 is schematic illustration a shipboard treatment system 200 in accordance with at least one aspect of the disclosure.

FIG. 3 schematically illustrates a shipboard treatment system 200 in accordance with at least one aspect of the disclosure. Treatment system 200 can comprise a source of seawater, such as a sea chest 110 fluidly connected to at least one ballast tank 120. Treatment system 200 can be directed to a water treatment system that is based on chlorine disinfection with the chlorine dose level being controlled by the redox potential of the treated water. For example, treatment system 200 can comprise an ORP controlled system that provides a variable chlorine dose level while maintaining a target or desired redox potential of treated seawater at a level that provides an effective mortality rate of the ANS. In some particular aspects of the disclosure, treatment system 200 can provide or, preferably, maintain a residual hypochlorous acid (HOCl) concentration at a level sufficient to provide disinfection of the treated seawater, independent of the quality of the water being treated. For example, treatment system 200 can obviate the need to compensate for the pH or contamination levels, or both, of the water to be treated. To facilitate such disinfection treatment, system 200 can comprise at least one probe or sensor 210, disposed to provide a measured characteristic of the water introduced into ballast tank 120, at least one controller or control system C disposed to receive a measured signal representative of the measured characteristic from probe or sensor 210. As noted, preferred, non-limiting embodiments involve sensors or probes that can provide a representation of an ORP level of the water. Treatment system 200 can further comprise at least one source 220 of at least one disinfecting agent or biocidal agent, disposed to introduce at least one biocidal agent into the water. For example, a chlorine supply system can be utilized to provide at least one disinfecting species into the water introduced into tank 120. As schematically illustrated, a control feedback loop can be established to regulate the introduction of the agent into the water to be treated. The at least one ORP probe can be directly inserted into the water piping or, for ease of maintenance, be installed in a circulating loop. In other cases, the ORP monitoring and control system can comprise a pump 240 which withdraws a side stream from the ballast water main supply 110. It is preferred that the pipes and flanges connecting the ORP probe with the main be constructed of the same material as the main line to prevent stray current that may harm the ORP probe or provide undesirable galvanic corrosion conditions. Preferably, the at least one probe has the same potential as the main line which can be effected by grounding the probe to the main.

Figure 4:
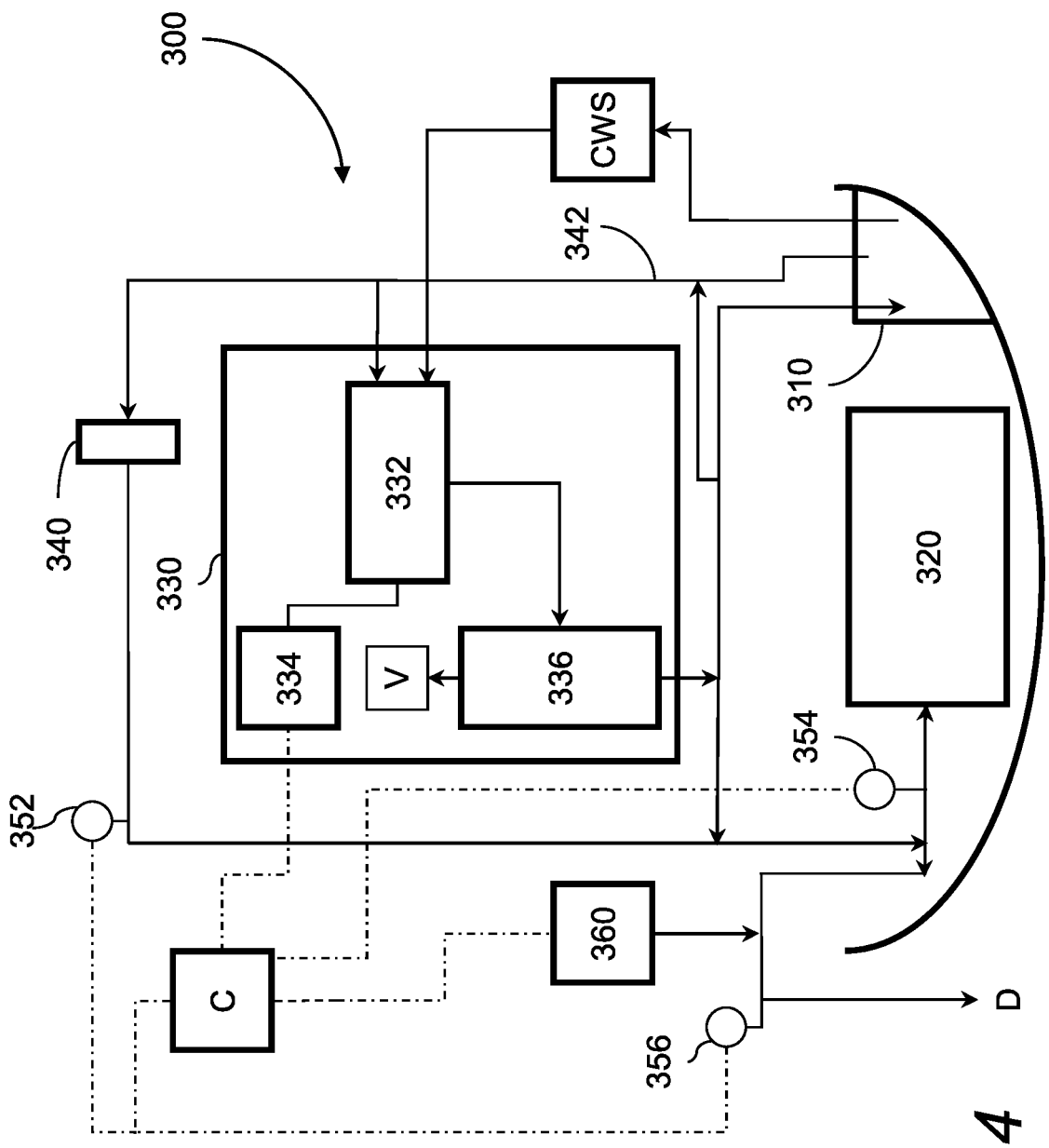
FIG. 4 is another schematic illustration of a treatment system in accordance with some aspects of the disclosure.
Figure 7:
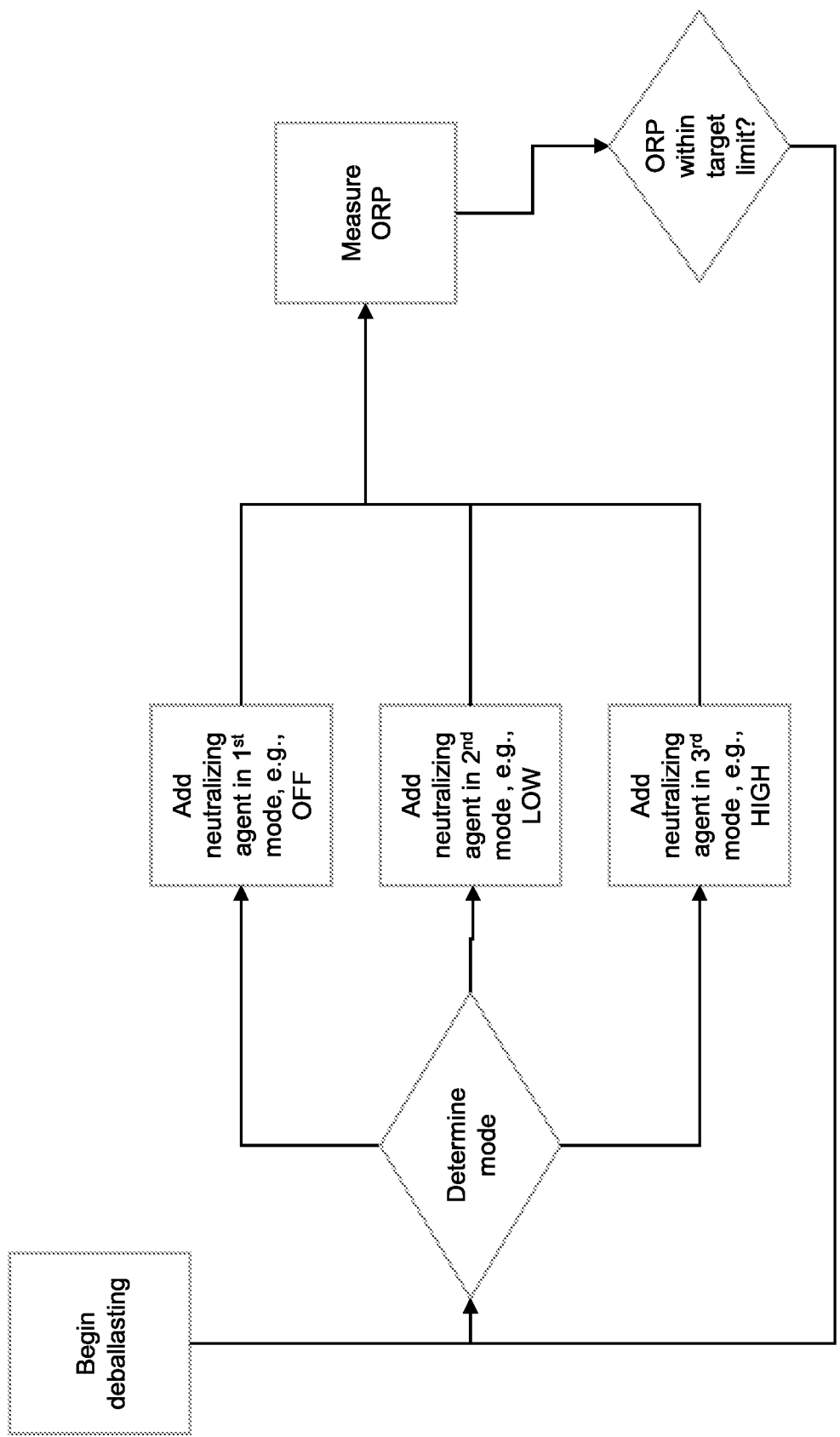
FIG. 7 is a schematic illustration of a neutralization control scheme that may be implemented in accordance with some aspects of the disclosure.

Another schematic illustration of a treatment system 300 in accordance with some aspects of the disclosure is presented at FIG. 4. System 300 can comprise a source of seawater such as sea chest 310 disposed in a ship. System 300 can further comprise or be fluidly connected to a buoyancy system typically comprising at least one ballast water tank 320. In particular embodiments, system 300 can comprise at least one source 330 of an oxidizer or biocidal agent fluidly connected to sea chest 310, and preferably to at least one ballast tank 320. In still other embodiments, sea chest 310 is fluidly connected to at least one system of the ship that utilizes seawater. For example, sea chest 310 can be fluidly connected to and provide seawater to at least one cooling water system CWS of the ship. Moreover, source 330 of an oxidizer or biocidal agent may be fluidly connected to the at least one cooling water system CWS. Source 330 can comprise at least one electrically driven apparatus such as an electrolyzer 332 that can electrochemically convert a precursor species into at least one disinfecting or biocide compound. Source 330 can further comprise at least one power supply 334, disposed to provide electrical energy to apparatus 332 to promote electrocatalytic conversion of chloride containing water supplied from sea chest 310, or cooling water system CWS, into the biocidal agent. Source 330 can further comprise at least one degassing unit operation 336 that facilitates removal of any gas, such as hydrogen gas, by way of at least one vent V, generated during the electrocatalytic biocidal agent generation process. At least one outlet of source 330 can be connected to tank 320. Preferably, an outlet of degassing unit operation 336 is fluidly connected to tank 320. In preferred embodiments, an outlet of source 330 is further connected to sea chest 310 to provide at least one biocide-containing stream from any of electrolyzer 332 and degassing unit operation 326. As schematically illustrated in FIG. 7, system 300 can utilize side stream withdrawal techniques wherein a portion of the seawater withdrawn from sea chest 310 is introduced into source 330 and a balance of the seawater to be introduced into ship buoyancy system 320 is filtered through at least one filter 340.

Oxidizer source 330 can comprise at least one electrically driven apparatus that generates at least one oxidizing species, such as, but not limited to, electrolyzer 332. System 300 can further comprise a monitoring system including at least one sensor or probe disposed to provide a representation of at least one characteristic or property of at least one component of system 300. As exemplarily illustrated, the monitoring system comprises at least one sensor 352 disposed to measure at least one property of water from sea chest 310 in a main piping line 342, at least one sensor 354 disposed to measure at least one property of water exiting buoyancy system 320, such as a characteristic of water in one or more ballast tanks of the buoyancy system, and, optionally, at least one sensor 356 disposed to measure a property of water to be discharged to outlet or discharge D from one or more ballast tanks. System 300 can further comprise at least one controller or control system C. Control system C is preferably configured to regulate or adjust at least one operating parameter of system 300. In particular aspects of the disclosure, control system C can receive at least one input signal from at least one sensor from the monitoring system. In further particular aspects of the disclosure, control system C can regulate at least one operating parameter of any of source 330 and the buoyancy system. In still other particular aspects, control system C can also monitor and control water discharging operations from ballast tank 320.

During buoyancy-adjusting operations, including but not limited to ballasting, an oxidizer or biocide containing stream, such as chlorine from source 330 can be introduced into sea chest 310 as well as main ballast water piping 342 through one or more chlorine distribution devices. The redox potential of the chlorinated water in main piping 342 can be monitored by the monitoring system comprising sensor 352 which can be an ORP sensor. Although sensor 352 is illustrated as being disposed downstream of filter 340, other embodiments may involve sensor 352 disposed upstream of filter 340 or even additional sensors upstream of filter 340 or in sea chest 310 to provide an indication or representation of a characteristic of the seawater. Control system C can be configured to receive one or more indications or representations from the monitoring system and accordingly adjust at least one operating parameter of the system such as an operating parameter of source 330, preferably based on the at least one representation. For example, control system C can be configured to maintain a treated water ORP in any of the unit operations of system 300 to within pre-set, acceptable, or desirable water discharge limits. Optionally, during discharging or de-ballasting operations, at least one reducing or neutralizing agent can be introduced into the discharged treated ballast water from, for example, a reducing or neutralizing agent source 360.

Thus, further aspects of the disclosure can involve ORP-based control systems and techniques as well as neutralization subsystems and methods that remove or reduce the concentration of residual biocide agent, e.g., chlorine and/or hypochlorite, concentrations in the treated water, such as the ballast water, preferably before being discharged during a de-ballasting operation, to an acceptable level, such as to a target ORP value. The target ORP value may be based on a regulatory limit. Dechlorination can utilize, for example, at least one reducing agent such as, but not limited to, sodium bisulfite, hydrogen peroxide, and ferrous salts. Neutralization of chlorine can be accomplished by operating or configuring the dechlorination controller, e.g., a first controller, to provide neutralization or dechlorination of biocides in the ballast water to be discharged to be within a range of from about 150 mV to about 350 mV, preferably within a range of from about 200 mV to about 300 mV, which is typical for untreated, raw seawater. Other neutralizing techniques can utilize any of activated carbon, ultraviolet based systems, and metal catalyzed stationary beds.

As an option, the same ORP control equipment can be used for both ballasting and de-ballasting operations, with an appropriate change of the ORP settings during de-ballasting. For example, ballast water, seawater, water containing a chloride species or combinations thereof, can be introduced from sea chest 110 into tank 120 so that the resultant ORP value of water in the tank has an ORP value that is less than or at about a desired or acceptable level, e.g., at 300 mV, or even less than 100 mV.

In particular embodiments, ORP sensor 356 can measure an ORP value or an oxidizer concentration of discharging water from the buoyancy system; and control system C can regulate an operating parameter of an oxidizer neutralizing system 360, such as a rate of addition or a dosing of the reducing agent that neutralizes, at least partially or to acceptable limits, any oxidizer or biocide in the discharging water, preferably based on the measurement signals from sensor 356. In some cases, a concentration of total residual oxidizer can be used in place of or in conjunction with the ORP sensor to achieve a desired level of residual oxidizer concentration in the ballast water being discharged. The desired discharge limits can be varied to satisfy jurisdictional mandates. For example, an acceptable chlorine level in discharge water can be less than about 1 mg/L, in some cases, less than about 0.5 mg/L, in some cases, less than 2 ppm.

In particular embodiments, ORP sensor 354 can measure an ORP value or an oxidizer concentration of discharging water from the buoyancy system; and control system C can regulate an operating parameter of an oxidizer neutralizing system 360, such as a rate of addition or a dosing of the reducing agent that neutralizes, at least partially or to acceptable limits, any oxidizer or biocide in the discharging water, preferably based on the measurement signals from sensor 354.

In particular embodiments, the control system C is configured to regulate addition of the neutralizing agent, preferably a dechlorinating agent, to the water to be discharged in at least one of three modes. For example Off, Low, and High modes.

In some configurations, the ballast water begins discharging from ballast tank 320, the oxidizer neutralizing system 360 will automatically be engaged in High mode if the ballast water to be discharged is greater than the target value. The High mode is maintained for 3-5 minutes to enable the ORP sensor 354 to reach steady state. Upon reaching steady state, or expiry of 3-5 minutes a mode of addition of the neutralizing agent engages automatically based upon signals from sensor 354. The Off mode is engaged if the ballast water to be ORP value of the ballast water to be discharged is less than the target value, e.g., less than about 300 mV, or in another example, less than about 200 mV. In a further alternative configuration, the Low mode is engaged if the ballast water to be discharged has an ORP value of less than about 200 mV. The High mode is engaged if the ORP value from sensor 354 is at least about 200 mV.

In particular embodiments, the ORP measurement from ORP sensor 356 will provide verification that the oxidizer neutralizing system 360 is engaged and operating within tolerable limits of compliance. For example, the verification may proceed in the following manner:
when the oxidizer neutralizing system 360 is in the Off mode, the ORP sensor 356 measurement should be the same as that of ORP sensor 354 plus/minus 50 mV, or
when the oxidizer neutralizing system 360 is in the Low mode, the ORP sensor 356 measurement should be less than that of ORP sensor 354. This will indicate an excess of the dechlorinating agent in the discharge water, or
when the oxidizer neutralizing system 360 is in the High mode, the ORP sensor 356 measurement should be less than 300 mV.

In particular embodiments, during de-ballasting, an operator may manually collect a sample of the discharged water in order to measure the total chlorine using a hand-held total residual oxidant (TRO) analyzer. The measurement should be less than 0.1 mg/L. If the measurement is greater than 0.1 mg/L, an operator may either select a higher level mode of neutralizing agent by switching manually from OFF to LOW, or from LOW to HIGH mode, or manually select a higher concentration value of the dechlorinating agent according to look-up tables provided, for example, see Table 1.

Theoretical weight ratios for dechlorinating agents such as sodium sulfite or sodium bisulfite to neutralize chlorine are 1.85 and 1.65, respectively. Typically an excess of dechlorinating agent is used to ensure a very low chlorine residual. For example, sodium sulfite from oxidizer neutralizing system 360 injected upstream of a ballast water pump (not depicted), for effective mixing, required a dose of 4.7-5 weight ratio of sodium sulfite to effectively reduce the chlorine concentration to below 0.1 mg/L.

In particular embodiments, the maximum dechlorinating agent concentration required may be categorized according to a type of a vessel and the trading pattern. It will be appreciated that not all ships fit exactly in to these categorizations. It has been observed that containerships and coaster ships typically have shorter voyages, and ballasting operations such as discharging water are expected to be performed in open seas. In such cases TRO levels as high as 2 mg/L are expected and thus require a 10-12 mg/L concentration level of sulfite as a maximum. For tankers and other typically longer voyage vessels it is safely assumed that TRO measurements of discharged water should not exceed 1 mg/L and therefore the maximum dose of dechlorinating agent should not exceed 5 mg/L.

Table 1 groups approximate dechlorinating agent dosage levels for vessels with respect to the oxidizer neutralizing system 360 modes of operation, the retention time of the ballast water, and the source of the ballast water.

TABLE 1

Look-up table for operator manual inputs of dechlorination modes.

| Treated Water Source | Retention Time (days) | Sulfite Dose mg/l | |
|---|---|---|---|
| | | Low | High |
| For Short Voyages (containerships, coasters) | | | |
| Open ocean water | <5 | 5 | 12 |
| | >5 | 3 | 8 |
| Coastal water | <2 | 5 | 8 |
| | 2-5 | 3 | 5 |
| | >5 | 1 | 3 |
| For Long Voyages (AM, SM, VLCC tankers, most bulkers) | | | |
| Open ocean water | <5 | 3 | 6 |
| | >5 | 1 | 3 |
| Coastal water | <2 | 3 | 6 |
| | 2-5 | 2 | 5 |
| | >5 | 1 | 3 |

An example of a neutralizing agent is sodium sulfite 15% w/w solution. This advantageous for handling because above this concentration it may recrystallize. For sodium bisulfite, a 30-40% w/w solution is procurable in liquid form.

Figure 5:
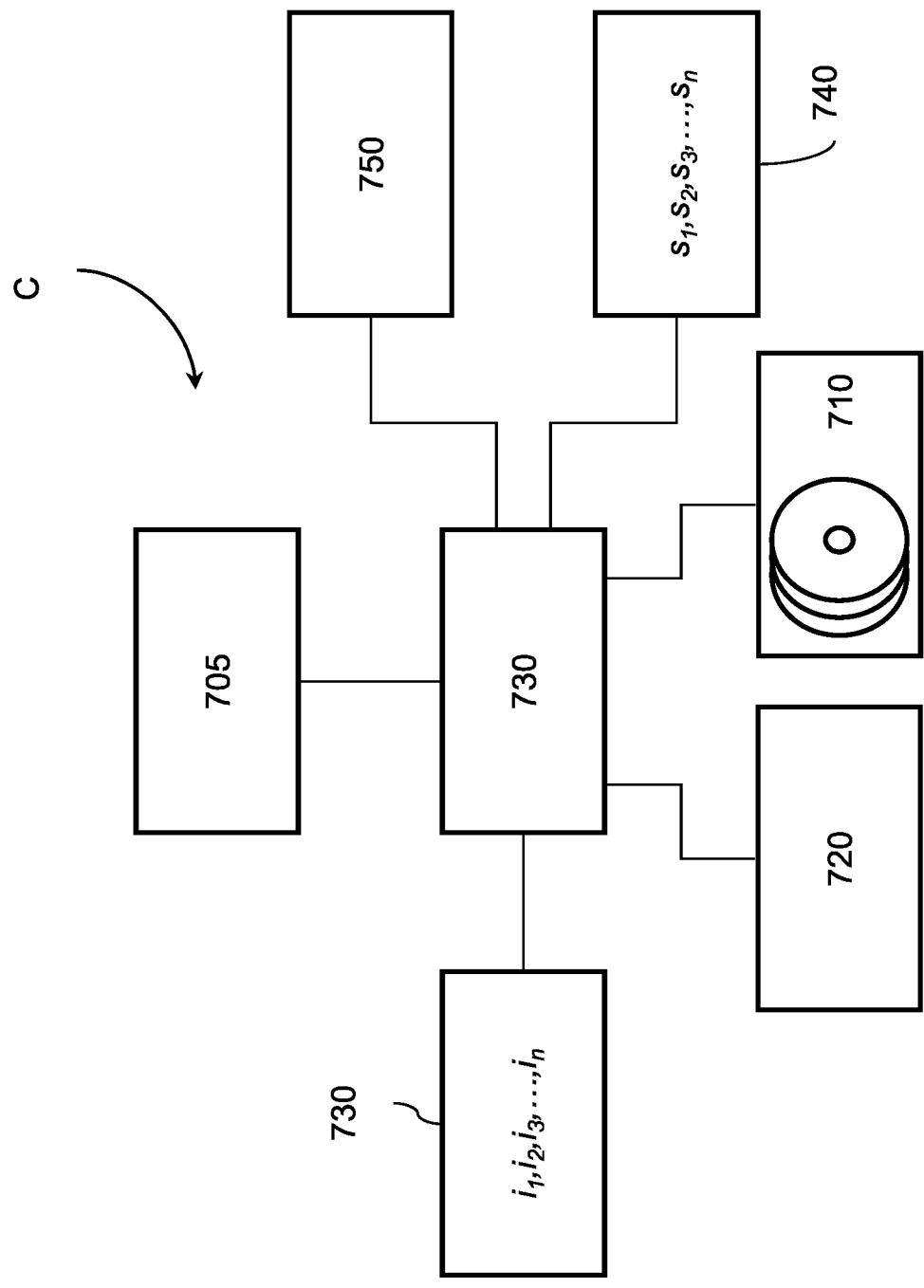
FIG. 5 is a representation of a control system that may be implemented in one or more aspects of the disclosure.

Control system C may be implemented using one or more computer systems as exemplarily shown in FIG. 5. Control system C may be, for example, a general-purpose computer such as those based on an Intel PENTIUM®-type processor or any other type of processor or combinations thereof. Alternatively, the computer system may include speciallyprogrammed, special-purpose hardware, for example, an application-specific integrated circuit (ASIC) or controllers intended for analytical systems.

Control system C can include one or more processors 705 typically connected to one or more memory devices 710, which can comprise, for example, any one or more of a disk drive memory, a flash memory device, a RAM memory device, or other device for storing data. Memory 710 is typically used for storing programs and data during operation of the treatment system and/or control system C. For example, memory 710 may be used for storing historical data relating to the parameters over a period of time, as well as operating data. Software, including programming code that implements embodiments of the disclosure, can be stored on a computer readable and/or writeable non-volatile recording medium, and then typically copied into memory wherein it can then be executed by the processor. Such programming code may be written in any of a plurality of programming languages, for example, Java, Visual Basic, C, C #, or C++, Fortran, Pascal, Eiffel, Basic, COBAL, or any of a variety of combinations thereof.

Components of the control system may be coupled by an interconnection mechanism 730, which may include one or more busses (e.g., between components that are integrated within a same device) and/or a network (e.g., between components that reside on separate discrete devices). The interconnection mechanism typically enables communications (e.g., data, instructions) to be exchanged between components of the system.

The control system can also include one or more input devices 730, for example, any of the sensors of the monitoring system, a keyboard, mouse, trackball, microphone, touch screen, that provide input signals $i_1, i_2, i_3, \ldots i_n$, and one or more output devices 740, for example, a printing device, display screen, or speaker that can provide output signals $s_1, s_2, s_3, \ldots, s_i$. In addition, the computer system may contain one or more interfaces (not shown) that can connect the computer system to a communication network (in addition or as an alternative to the network that may be formed by one or more of the components of system).

According to one or more embodiments of the disclosure, the one or more input devices may include sensors for measuring parameters. Alternatively, the sensors, the metering valves and/or pumps, or all of these components may be connected to a communication network that is operatively coupled to computer system. For example, sensors 352, 354, and 356 may be configured as input devices that are directly connected to the computer system; and metering valves and/or pumps may be configured as output devices that are connected to the computer system, and any one or more of the above may be coupled to another computer system or component so as to communicate therewith over a communication network. Such a configuration permits one sensor to be located at a significant distance from another sensor or allows any sensor to be located at a significant distance from any subsystem and/or the controller, while still providing data therebetween.

Although the control system is shown by way of example as one type of computer system upon which various aspects of the disclosure may be practiced, it should be appreciated that the disclosure is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the disclosure may be implemented in software, hardware or firmware, or any combination thereof. For example, one or more segments of an algorithm executable by the controller can be performed in separate computers, which in turn, can be communication through one or more networks.

The function and advantages of these and other embodiments of the disclosure can be further understood from the examples below, which illustrate the benefits and/or advantages of the one or more systems and techniques of the disclosure but do not exemplify the full scope of the disclosure.

Figure 6:
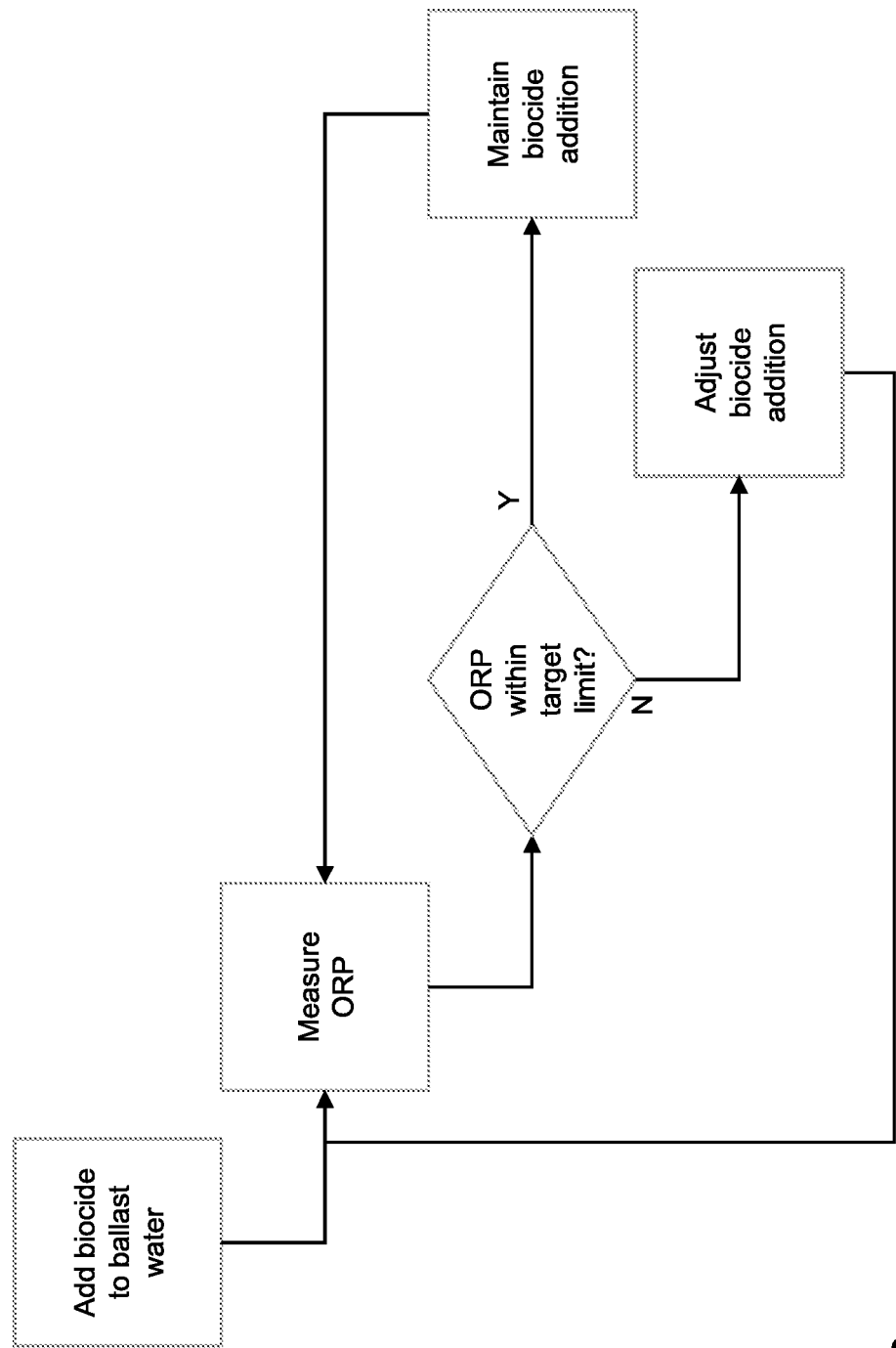
FIG. 6 is a schematic illustration of a shipboard disinfection control scheme in accordance with some aspects of the disclosure.

FIGS. 6 and 7 exemplarily show control algorithms for the chlorination and dechlorination processes, respectively, that, for example, may be implemented in the control system C, in accordance with one or more aspects of the disclosure. In FIG. 6, a generated biocide is added to the ballast water, which may be upstream or downstream of the filter, or both. The ORP value is measured and used to adjust the rate of generation of the biocide or amount of biocide added, or both, to achieve a desired target value. The ORP is continually, continuously, or intermittently measured to maintain or adjust the biocide introduction. In FIG. 7, when deballasting begins, an initial mode is used to introduce the neutralizing agent, either manually or automatically, such as in a LOW mode or a HIGH mode. The ORP value of the ballast water being discharged is measured and compared to a target. If the measured ORP value is within the target value, e.g., less than about 300 mV, the mode is re-determined to be in any of the OFF mode or the LOW mode. If the measured ORP value is greater than the target, the HIGH mode is maintained.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is therefore to be understood that the embodiments described herein are presented by way of example only and that, within the scope of the appended claims and equivalents thereto; the disclosure may be practiced otherwise than as specifically described.

Moreover, it should also be appreciated that the disclosure is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the disclosure as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A ballast water management (BWM) system configured to introduce ballast water into a ballast tank through a ballast water line and to discharge ballast water from the ballast tank after a retention time in the ballast tank, the system comprising:
   a biocide source configured to introduce a biocide into the ballast water;
   a neutralization system configured to introduce, during an introduction period, a neutralizing agent, selected to at least partially neutralize the biocidal activity of the biocide, into the discharge ballast water at a neutralization agent introduction site in at least one of
      a LOW mode, at a first dosage rate of neutralizing agent, and
      a HIGH mode, at a second dosage rate of neutralizing agent that is greater than the first dosage rate;
   a first oxidation-reduction potential (ORP) sensor disposed fluidically between the ballast tank and the neutralization system and configured to measure a first ORP value of the discharge ballast water; and
   a controller configured to:
      cause the neutralization system to introduce the neutralizing agent at a dosage level selected based on a mode of operation of the neutralization system, the retention time of the ballast water in the ballast tank, and a source of the ballast water, and
      cause the neutralization system to engage in the HIGH mode at a beginning of an introduction period when the ballast water begins discharging from the ballast tank, and to maintain operation in the HIGH mode until measurements by the first ORP sensor reach steady state.

2. The system of claim 1, further comprising a ballast water pump disposed to pump the ballast water into the ballast tank through the ballast water line.

3. The system of claim 1, further comprising a filter fluidly connected to the ballast water line and disposed to remove at least a portion of solids from the ballast water to be introduced into the ballast tank, wherein the biocide source is configured to introduce at least a portion of the biocide upstream of the filter.

4. The system of claim 1, wherein the biocide source comprises an electrolyzer configured to electrolytically generate the biocide from a source of chloride-containing water, wherein the source of chloride-containing water is any of a ship cooling water system, a sea chest, and a chloride-containing water storage tank.

5. The system of claim 1, wherein the biocide source comprises an inlet fluidly connected to a source of chloride-containing water that is fluidly isolated from the ballast water line.

6. The system of claim 1, wherein the neutralization system discontinues introducing the neutralizing agent, in an OFF mode, if, after the introduction period, the first ORP value is less than a target ORP value.

7. The system of claim 6, further comprising:
   a second ORP sensor configured to measure a second ORP value of the discharge ballast water downstream from the neutralization agent introduction site; and
   a controller configured to confirm neutralization of the biocide in the discharge ballast water if a difference between the first ORP value and the second ORP value is within a tolerance ORP value.

8. The system of claim 1, wherein the neutralization system discontinues introducing the neutralizing agent in the HIGH mode and introduces the neutralizing agent in the LOW mode if, after the introduction period, the first ORP value is less than a target ORP value and the retention time is less than a minimum retention time.

9. The system of claim 8, further comprising:
   a second ORP sensor configured to measure a second ORP value of the discharge ballast water downstream from the neutralization agent introduction site; and
   a controller configured to confirm neutralization of the biocide in the discharge ballast water if the second ORP value is less than the first ORP value.

10. The system of claim 1, wherein the neutralization system continues introducing the neutralizing agent in the HIGH mode if, after the introduction period, the first ORP value is greater than a target ORP value.

11. The system of claim 10, further comprising:
    a second ORP sensor configured to measure a second ORP value of the discharge ballast water downstream from the neutralization agent introduction site; and
    a controller configured to confirm neutralization of the biocide in the discharge ballast water if the second ORP value is less than a conformity ORP value.

12. A method of managing discharge of discharge ballast water from a ballast tank through a ballast line, comprising:
    determining a first oxidation reduction potential (ORP) value of the discharge ballast water with an ORP sensor;
    introducing a neutralizing agent from a neutralization system into the discharge ballast water at a dosage rate during an introduction period, the neutralizing agent selected to at least partially neutralize biocidal activity of a biocide in the discharge ballast water, the dosage rate selected based on a mode of operation of the neutralization system, a retention time of the ballast water in the ballast tank, and a source of the ballast water, the neutralization system configured to engage in a HIGH mode of operation at a beginning of an introduction period when the ballast water begins discharging from the ballast tank, and to maintain operation in the HIGH mode until measurements by the ORP sensor reach steady state;
    determining a second ORP value of the discharge ballast water after introducing the neutralizing agent into the discharge ballast water; and
    after the introduction period, discontinuing introduction of the neutralizing agent if the first ORP value is less than a target ORP value or continue introducing of the neutralizing agent at the dosage rate if the first ORP value is greater than the target ORP value.

13. The method of claim 12, further comprising electrolytically generating the biocide from a chloride-containing water from a water source, wherein the water source is fluidly isolated from the ballast line.

14. The method of claim 13, further comprising, removing from the ballast water at least a first portion of particulates or organisms having at least one dimension of at least about forty microns before introducing the ballast water into the ballast tank.

15. The method of claim 14, further comprising, before removing from the ballast water the at least a first portion of particulates or organisms, introducing a first portion of the biocide into the ballast water, and introducing a second portion of the biocide into the ballast water before being introduced into the ballast tank.

16. The method of claim 15, further comprising confirming neutralization of the biocide based on a difference between the first ORP value and the second ORP value.

17. The method of any one of claims 12-16, wherein the target ORP value is about 200 mV.

18. A ballast water management (BWM) system fluidly connectable to a ballast tank of a ship, comprising:
 a chlorination system comprising an electrolyzer configured to generate a chlorine-based biocide to be introduced into ballast water;
 a first controller configured to regulate operation of the electrolyzer;
 a dechlorination system fluidly connected downstream from the ballast tank, the dechlorination system comprising a source of neutralizing agent selected to reduce the chlorine-based biocide in ballast water to be discharged from the ship;
 a first oxidation-reduction potential (ORP) sensor configured to determine an ORP value of the ballast water to be discharged;
 a second controller configured to regulate addition of the neutralizing agent to the ballast water to be discharged in at least one of a first dechlorination mode, and a second dechlorination mode, to cause the dechlorination system to introduce the neutralizing agent at a dosage level selected based on a mode of operation of the dechlorination system, a retention time of the ballast water in the ballast tank, and a source of the ballast water, and to cause the dechlorination system to engage in the second dechlorination mode at a beginning of an introduction period when the ballast water begins discharging from the ballast tank, and to maintain operation in the second dechlorination mode until measurements by the first ORP sensor reach steady state,
 wherein the second controller regulates addition of the neutralizing agent in the first dechlorination mode if the ORP value of the ballast water to be discharged is less than a target ORP value,
 wherein the second controller regulates addition of the neutralizing agent in the second dechlorination mode if the ORP value of the ballast water to be discharged is greater than or equal to the target ORP value.

19. The BWM system of claim 18, wherein the target ORP value is less than about 200 mV.

20. The BWM system of claim 19, wherein the dechlorination system further comprises a second ORP sensor configured to determine an ORP value of the ballast water downstream from a point of introduction of the neutralizing agent into the ballast water to be discharged.

21. The BWM system of claim 20, wherein the second controller is further configured to regulate addition of the neutralizing agent to a high target dechlorination concentration of neutralizing agent in the ballast water to be discharged if the downstream ORP value measured by the second ORP sensor is greater than the target ORP value.

22. The BWM system of claim 21, comprising an integrated control system including the first controller and the second controller.

* * * * *